United States Patent

Frimberger

[15] 3,653,702

[45] Apr. 4, 1972

[54] SAFETY LOCK DEVICE

[72] Inventor: Herbert H. Frimberger, Middlefield, Conn.

[73] Assignee: Polymer Machinery Corp., Berlin, Conn.

[22] Filed: Nov. 12, 1970

[21] Appl. No.: 88,647

[52] U.S. Cl..............................292/251, 51/268, 200/61.67
[51] Int. Cl.............................................................E05c 5/04
[58] Field of Search......................200/61.67, 61.81; 51/268; 292/251, 256.75

[56] References Cited

UNITED STATES PATENTS

| | | | |
|---|---|---|---|
| 1,724,930 | 8/1929 | Hart | 200/61.67 |
| 1,990,189 | 2/1935 | King | 292/256.75 X |
| 2,011,108 | 8/1935 | Lehmann | 51/268 |
| 3,018,127 | 1/1962 | Dobrosielski et al. | 292/251 |

*Primary Examiner*—Richard E. Moore
*Attorney*—Spencer & Kaye

[57] ABSTRACT

A safety interlock arrangement for the protective cover of an electrical motor driven grinder or the like whereby the power to the motor is cut off when the protective cover is not in its normally closed position and fastened to the base of the grinder. The interlocking arrangement includes a screw which is mounted on the side of the protective cover and which engages the base or support for the grinder to lock the protective cover in its closed position. A bearing block, containing a mercury switch which controls the power input into the electric motor, is pivotally mounted on the side of the protective cover so that it normally rests against the free end of the screw. In order to disengage the screw from the base, the bearing block must be pivoted to a position wherein the mercury switch is open, thus disconnecting the power from the electric motor.

10 Claims, 3 Drawing Figures

PATENTED APR 4 1972
3,653,702
FIG. 1
FIG. 3
FIG. 2
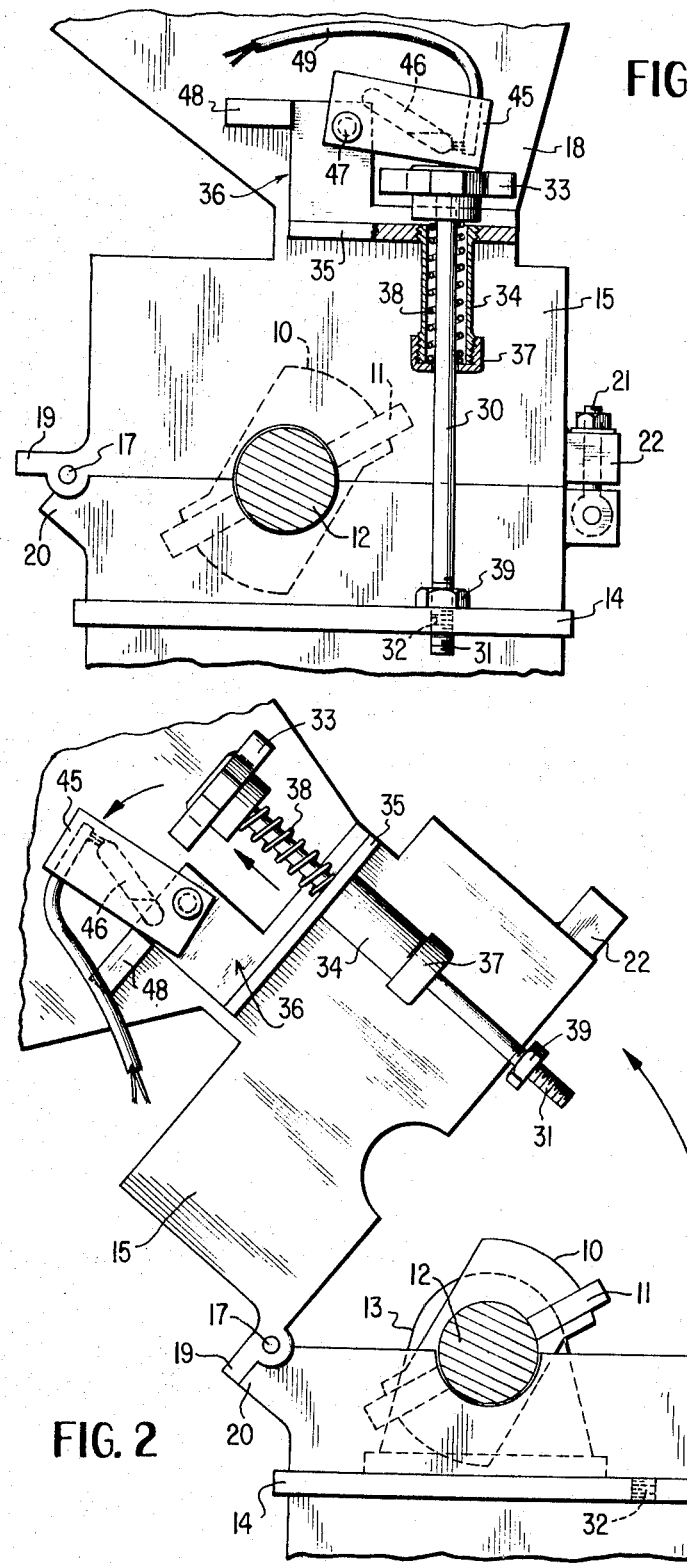
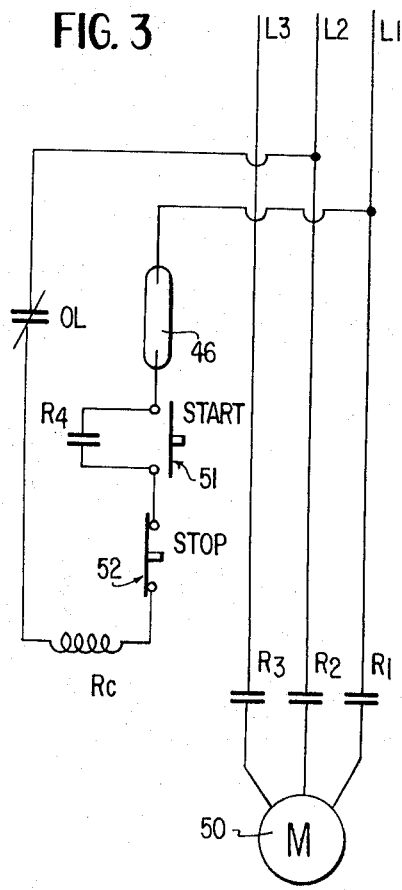
INVENTOR
Herbert H. Frimberger
BY Spencer & Kaye
ATTORNEYS.

SAFETY LOCK DEVICE

BACKGROUND OF THE INVENTION

This invention relates to a safety interlocking device for an electrical motor driven grinder or the like. More particularly, this invention relates to a safety interlock device for such machines whereby the electrical power to the electric motor is shut off whenever the protective cover is not securely fastened in place.

In power driven rotary machines for the grinding, cutting or otherwise changing the basic form of a material, such as a plastic or a metal, it is customary to provide the driven rotary element containing the blades with a protective cover in order to prevent injury to an operator due to a portion of his clothing or body coming into contact with the blades while they are being driven. Additionally, in order to insure that the protective cover is securely in place when the machine is operating, it is also customary to provide the protective cover with a safety interlock device which permits power to be delivered to the machine only when the cover is thus securely in place.

According to one known type of safety interlock device, a limit switch, which is connected in the power supply circuitry to the motor, is positioned adjacent a bolt or screw utilized to secure the protective cover in a manner whereby the switch is closed by the bolt or screw when it securely fastens the cover in its closed position. While such an arrangement may operate satisfactorily under many conditions, it does suffer from a number of drawbacks. For example, it is possible for a limit switch to stick or remain in a closed position even when the bolt or screw is in its unsecured position. This is particularly true when the safety interlock device is used in a particularly dirty or dusty environment, for example, on a grinding machine for plastic parts. Additionally, due to their particular nature, limit switches can usually be closed by objects other than the intended locking bolt, e.g., manually by the operator, when the protective cover is not in place. Accordingly, since under each of these conditions, the motor and hence the machine may be restarted without the protective covering being in its closed position, such interlocking arrangements do not in fact present a fail-safe type of safety interlock device, i.e., one which is not subject to the environmental conditions and will not permit operation of the motor except when the cover is in place.

SUMMARY OF THE INVENTION

It is accordingly a primary object of the present invention to provide a safety interlocking device for the protective cover of an electrical motor driven grinder or the like which permits electrical power to be delivered to the motor only when the protective cover is secured in its closed position.

It is the further object of the present invention to provide a fail-safe type of safety interlocking device for the protective cover of an electrical motor driven grinder or the like which is not sensitive to the environmental conditions and which positively prevents the overriding thereof when the protective cover is not in its secured closed position.

The above objects are achieved according to the present invention by means of a relatively simply safety interlocking device comprised essentially of a mechanical locking member for securing the protective cover pivotally mounted on the base of the machine in its closed position, and a pivotally mounted mercury switch connected in the power supply control circuitry for the electric motor and which cooperates with the locking member.

The locking member comprises an elongated rod having a fastening means, preferably threads, at one end and having a handle at the other end. The rod is mounted on the side of the protective cover in a manner whereby it is slidable along and in the event threads of the like are used as the fastening means, rotatable about, its longitudinal axis. Means, e.g., a threaded bore, is provided on the base of the machine in a position whereby it can engage the end of the rod having the fastening means to secure the cover in its closed position.

The mercury switch is contained in a bearing block pivotally mounted on the side of the protective cover adjacent the end of the rod bearing the handle. The bearing block is mounted so that it is free to travel between a first position wherein it rests against a surface of the handle and a second position wherein it is out of the axle travel path of the rod. The mercury switch is situated in the bearing block in a manner whereby it will only be closed when the bearing block is in the first position and the rod securely fastened to the base of the machine.

According to a further feature of the invention, the rod is provided with a spring which tends to move the rod in an axial direction away from the base when not engaged. In this manner, the bearing block is prevented from accidentally tilting back into its first position to close the mercury switch.

According to still a further feature of the invention, the protective cover and the mercury switch pivot about substantially parallel axes and in the same direction to achieve their respective open and closed position. Because of this arrangement, and due to the particular nature of mercury switches, closure thereof is impossible when the protective cover is in an open position even when the bearing block is pivoted into a position wherein it bears against the end of the handle of the locking screw.

BRIEF DESCRIPTION OF THE DRAWINGS

FIG. 1 is a side view of a grinding machine which is provided with a safety interlocking device according to the invention with the protective cover in a closed and locked position.

FIG. 2 is a side view of a grinding machine incorporating a safety interlocking device according to the invention with the protective covering in an open position.

FIG. 3 is a schematic diagram of the power supply and control circuitry for the electric motor of the grinding machines of FIGS. 1 and 2.

DESCRIPTION OF THE PREFERRED EMBODIMENT

Referring now to FIGS. 1 and 2 there is shown a grinding machine for plastic materials having a rotor 10 with cutting blades 11 and a rotor shaft 12. To rotatably mount the rotor in the machine, each end of the rotor shaft 12 is mounted in a separate journal bearing (not shown) secured in a bearing support 13 mounted on the upper surface of the base 14 of the machine.

As a safety precaution to prevent access to the blades 11 while the rotor 10 is being driven by means of an electric motor (not shown in these Figures), the machine is provided with a protective cover 15 which is pivotally mounted on the base 14 by means of a hinge 17. In the particular machine illustrated, protective cover 15 constitutes a portion of the hopper 18 through which the scrap plastic material is fed to the rotor 10 to be ground by the blades 11 thereof. Since it is undesirable that the protective cover 15 with the hopper 18 thereon be permitted to pivot completely about the hinge 17 when it is in the open position, and thus possibly damage the cover, the cover is provided with a laterally extending projecting member 19 which abuts a stop 20 on the base when the cover 15 is pivoted to its open position, thus allowing the cover 15 to remain in the position illustrated in FIG. 2. If desired, a locking arrangement consisting of a pivot bolt 21 which is mounted on the base and which can be pivoted into a notch formed in a block 22 on the protective cover 15, may be provided to securely lock the cover to the base 14 in the closed position.

To insure that power can only be delivered to the motor drive coupled to the rotor shaft 12 when the cover 15 is in the closed position indicated in FIG. 1 and secured to the base 14, according to the safety interlock arrangement of the invention, a further locking arrangement is provided. As illustrated, this additional locking arrangement comprises a bolt or screw in the form of a rod 30 which is provided with threads 31 on at least the lower end thereof for engaging a threaded bore 32 formed in the base 14. For ease in engaging the threads 31 with the threads of the bore 32, the other end of the rod 30 is preferably provided with a handle 33 having a greatly enlarged diameter. It is to be understood however that this handle is merely by way of example only, and that if desired, the rod 30 may be merely an elongated bolt with the handle 33 corresponding to the bolt head.

Locking screw or rod 30 is mounted on the side of the cover 15 in a manner whereby it is both rotatable about and slideable along its longitudinal axis, and aligned so that it can engage the threaded bore 32 when the cover is in the closed position. The relatively simple illustrated arrangement for mounting rod 30 in this manner comprises a tube 34 threaded or welded to a laterally projecting portion 35 of a flange 36 welded or otherwise firmly connected to the side of the cover 15. The lower end of the tube or pipe 34 is provided with a cap 37 having a central opening therein through which the rod 30 passes. Coaxially mounted with the rod 30 within the tube 34, and supported by the cap 37, is a spring 39 which exerts a force on the lower surface of the handle 33 tending to urge the rod 30 out of engagement with the base 14. That is, when the threads 31 engage the threads of the bore 32 as shown in FIG. 1, the spring 39 is compressed between the cap 37 and the lower surface of the handle 33. A locking nut 39 is permanently affixed, for example by braising or welding, to the rod 30 at a predetermined distance from the end thereof to serve both as a stop for preventing the rod 30 from passing through the opening in the cap 37 and for determining the length of the rod 30 which may be threaded into the bore 32 for reasons to be more fully explained below.

Mounted on the side of the protective cover 15 adjacent the upper end of the rod 30, i.e. the end having the handle 33, is a bearing block 45 having a mercury switch 46 securely fastened therein, for example by means of a plastic encapulant. Bearing block 45 is pivotally mounted on a pin 48 so that, when the locking screw or rod 30 is in the locked position illustrated in FIG. 1, the block 45 is free to pivot between a normal position wherein it rests against the upper end or bearing surface 48 of the rod 30 i.e. the substantially horizontal position illustrated in FIG. 1, and a substantially vertical position wherein it is out of the path of axial travel of the rod 30 and against an abutment or stop member 48. Preferably, the pivot pin 47 is positioned relative to the axis of the rod 30 so that the sense of rotation of the bearing block 45 when it is moved out of its normal position will be the same as that for the protective cover 15 when it is moved to its open position.

The mercury switch 46, the contacts of which are connected by leads 49 in the power control circuitry for the motor of the grinding machine, is positioned within the bearing block 45 so that when it is in its normal position (FIG. 1), the mercury switch will be closed, thus permitting power to be applied to the motor. Conversely, when the bearing block is pivoted or tilted out of its normal position, the resulting tilt of the mercury switch will cause the switch to open, thus preventing power from being applied to the motor of the grinding machine.

Referring now to FIG. 3, there is shown the electrical power control circuit, including the mercury switch of the interlock according to the invention, for controlling the motor of the grinder. As illustrated, three-phase power is supplied to the motor 50 via respective power leads L1, L2, and L3. To control the supply of power via these three lines L1–L3 to the motor 50, a control circuit, including the series connection of the mercury switch 46, a normally open push-button start switch 51, a normally closed push-button stop switch 52 and the coil $R_c$ of a relay, is connected across a pair of the power leads, e.g. leads L1 and L2 as illustrated. In addition to the coil $R_c$, the relay includes four pairs of normally open relay contacts $R_1$–$R_4$ which are controlled by the relay coil $R_c$. The relay contacts $R_1$, $R_2$, $R_3$, are connected in the power lines L1, L2, and L3, respectively, to the motor 50, while the relay contacts $R_4$ are connected across the normally open line contacts of the start switch 51. As illustrated, a pair of normally closed contacts OL of an overload relay is also preferably connected in this series circuit.

To start the motor 50, the push-button of the start switch 51 is depressed to complete the circuit through the coil $R_c$, thus causing the relay contacts $R_1$–$R_4$ to be closed. Closure of the contacts $R_1$–$R_3$ allows electrical power to be delivered to the motor 50, while closure of the contacts $R_4$ maintains the circuit through the coil $R_c$ after the push-button of the switch 51 has been released. Stoppage of the motor in the normal manner is provided by merely depressing the push-button of the stop switch 52 to break the circuit through the coil $R_c$ and thus open the contact $R_1$–$R_4$. As is obvious, with this circuit, and regardless of its condition or the operation of the switches 51 and 52, no power can be delivered to the motor in the event the mercury switch 46 of the interlock arrangement is open.

In order to more clearly point out the fail-safe nature of the interlocking safety device according to the invention, the mode of operation thereof will not be briefly discussed. In order to open the protective cover 15, in addition to unlatching any locking bolt such as the pivot bolt 21, it is also necessary to disengage the threads 31 from the threaded bore 32 by rotating the shaft 30. However, in order to rotate the handle 30, and thus cause the rod 13 to be axially moved, it is preferable, if not absolutely necessary, to first tilt the bearing block out of the path of axial movement of rod 30, thereby opening the mercury switch 46 and disrupting the power to the motor for the grinder. Note, however, that even in the event that this preferred mode of operation is not utilized, i.e. pivoting the bearing block 45 so that it rests against the stop 48 prior to beginning the disengagement of the rod 30 from the bore 32, the axial movement itself of the rod 30 will cause a tilting or pivoting of the bearing block 45 in the desired manner, thus eventually causing the mercury switch 46 to open in any case.

Once the rod 30 is disengaged from the base 14, the spring 38 will cause sufficient axially movement of the rod 30 to positively pivot the bearing block 45 out of the path of the rod 30 and cause the mercury switch 46 to open. The extended axial position of the rod 30 as a result of the force exerted thereon by the spring 38, additionally prevents the bearing block 45 from being accidentally tilted into a position wherein the mercury switch 46 is closed and thus allow power to be applied to the motor. Note moreover, that even if the rod 30 were manually depressed toward the base 14, and the bearing block 45 tilted to a position where the mercury switch 46 could be closed, there would be no resulting danger since the protective cover 15 would still be in its closed position.

Once the cover has assumed its open position as shown in FIG. 2, as a result of both the bearing block 45 and the cover 15 being pivoted in the same direction from their normal positions, the tilt of the protective cover 15 will not permit the mercury in the switch 46 to flow to a position wherein the contacts thereof will be closed. This is true, even if the rod 30 were to be depressed from the position shown in FIG. 2 and the bearing block tilted until it rested on the bearing surface 48. Only when the mercury switch 46 can assume a substantially horizontal position in the illustrated embodiment can the switch contacts be closed. Thus, there is no way of overriding the safety locking device according to the invention and thus providing power to the motor while the cover 15 is open.

It should be noted, that although means other than threads 31 and a threaded bore 32 may be utilized to securely fasten the rod 30 to the base 14, e.g. a fastening arrangement wherein only sliding movement of the rod 30 is required, that the illustrated arrangement is preferred since it provides a time delay which may be put to advantage as an additional safety feature.

In addition to the dangers resulting from a driven rotor when the protective cover is open, it should be noted, that it is still possible for injury to occur to the operator by means of the rotating blades 11 between the time that the power is disconnected from the motor 50 and the rotor 10 comes to rest. Accordingly, to prevent opening of the cover 15 before the rotor 10 has come to rest, and after opening of the mercury switch 46 has occurred, the lock nut 39 is preferably positioned a distance from the end of the rod 30 such that the time required to disengage the threads 31 of the rod 30 from the threaded bore 32 is sufficient to allow the frictional forces acting on the rotor 10 to cause it to come to rest before the cover 15 can be opened. The time delay provided by this very simple additional feature of the invention, thus, prevents the operator from coming into contact with the rotor 10 while it is rotating as a result of power delivered by the motor 50.

It will be understood that the above description of the present invention is susceptible to various modifications, changes and adaptations, and the same are intended to be comprehended within the meaning and range of equivalents of the appended claims.

I claim:

1. A safety interlocking arrangement for an electrical motor driven grinder or the like, comprising in combination:
   a protective cover for said grinder pivotally mounted on the base of said grinder for movement between a normally closed position and an open position;
   a rod mounted on an external side surface of said cover so that it is at least slidable along its longitudinal axis, said rod having fastening means at one end and having a handle with a bearing surface at the other end thereof;
   means provided on said base of said grinder for engaging said fastening means on said rod when said cover is in a closed position to lock said cover to said base;
   a bearing block pivotally mounted on said side surface of said cover adjacent said other end of said rod so that said bearing block is free to pivot between a first normal position wherein it rests on said bearing surface, and a second position wherein said block is out of the axial travel path of said rod; and
   a mercury switch securely mounted within said bearing block so that said switch is closed when said bearing block is in said first position and said rod is securely engaged with said base, and is open when said bearing block is in said second position, said mercury switch being connected in and controlling the operation of the power supply circuit for the electric motor driving said grinder, whereby power can be delivered to said grinder only when said cover is in its normally closed position and securely fastened to said grinder base via said rod.

2. The apparatus as defined in claim 1 further comprising a spring coaxially mounted on said rod so that said spring is compressed when said rod is fastened to said grinder base, said spring causing said rod to move along its longitudinal axis to a position wherein said bearing block is prevented from being pivoted into its first position when said rod is disengaged from said base.

3. The apparatus as defined in claim 2 wherein said rod is mounted so that it is also rotatable about its longitudinal axis.

4. The apparatus as defined in claim 2 wherein said fastening means comprises a threaded portion of said rod, and wherein said means for engaging said fastening means is a threaded bore.

5. The apparatus as defined in claim 4 wherein the length of the threaded portion of said rod engaged by said threaded bore when said cover is securely locked in its closed position is such that the time required to disengage said rod from said bore, after pivoting said bearing block to said second position, is sufficient to allow said grinder to come to rest.

6. The apparatus as defined in claim 2 wherein said cover and said bearing block pivot about parallel axes and in the same direction to and from their respective normal positions.

7. The apparatus as defined in claim 6 wherein said cover and said bearing block pivot about substantially horizontal axes, wherein said rod is mounted in a substantially vertical plane, and wherein said bearing block is substantially horizontal when in its said normal position.

8. The apparatus as defined in claim 2 including stop means for limiting the rotation of said bearing block when it is in said second position to prevent said mercury switch from assuming a position other than said first position wherein it is closed.

9. The apparatus as defined in claim 3 wherein said rod is mounted on said cover by means of an arrangement including:
   a flange securely fastened to said side surface of said cover and extending laterally therefrom, and
   a tube securely fastened to said flange and having a cap, which is provided with a central opening, on at least the lower end thereof, said rod extending coaxially through said tube and said opening; and wherein said spring is disposed at least partially within said tube with one end thereof bearing against the inner surface of said cap, and the other end thereof bearing against said handle.

10. The apparatus as defined in claim 9 wherein said cover and said bearing block pivot about substantially horizontal axes and in the same direction to and from their respective normal positions; said rod is mounted in a substantially vertical plane; and said bearing block is substantially horizontal when in its normal position.

* * * * *